(12) United States Patent
Raccio et al.

(10) Patent No.: US 6,401,543 B1
(45) Date of Patent: Jun. 11, 2002

(54) PRESSURE MEASUREMENT INSTRUMENT WITH INTEGRATED VALVE SYSTEM

(75) Inventors: Stephen A. Raccio, Oxford; John W. Henson, Orange, both of CT (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 09/546,856

(22) Filed: Apr. 10, 2000

(51) Int. Cl.[7] .................................................. G01L 9/00
(52) U.S. Cl. ........................................................ 73/753
(58) Field of Search ............ 73/714, 753; 137/512–513, 137/340; 166/305.1, 53, 54, 66.6, 66.7, 334.4

(56) References Cited

U.S. PATENT DOCUMENTS

| | | | |
|---|---|---|---|
| 4,950,016 A | * 8/1990 | Kumar | 294/64.2 |
| 4,996,627 A | 2/1991 | Zias et al. | 361/283 |
| 5,638,775 A | * 6/1997 | Hollis | 137/340 |

* cited by examiner

Primary Examiner—William Oen
(74) Attorney, Agent, or Firm—Jenkens & Gilchrist, P.C

(57) ABSTRACT

An electronic pressure instrument that is easy to monitor and calibrate, and is relatively small and functional, is disclosed. The electronic pressure instrument includes two pressure inputs for receiving two fluids, which can eventually be provided to a transducer for converting a pressure differential of the two fluids to an electrical signal. Positioned between the two pressure inputs and the transducer is a rotatable valve having a mechanical test port and a plurality of conduits for selectively directing at least one of the fluids to the transducer or the mechanical test port. When the valve is in a first position, the two fluids are directed to the transducer. When the valve is in a second position, the at least one fluid is directed to the mechanical test port.

27 Claims, 5 Drawing Sheets

PRESSURE MEASUREMENT INSTRUMENT WITH INTEGRATED VALVE SYSTEM

BACKGROUND OF THE INVENTION

The present invention relates to measurement instruments and, more particularly, to a flexible, efficient, and easy-to-use mechanical-to-electrical measurement instrument.

Measurement instruments are growing in popularity because of their small size and increasing functionality. However, despite the advances of size and functionality, many mechanical-to-electrical measurement instruments still require continual monitoring and calibration to retain measurement accuracy.

For example, an electronic device for measuring pressure (an electronic pressure gauge) must often be compared to a known reference, such as a mechanical pressure standard. This is often due to the inability of a pressure to electric transducer or other component(s) to maintain an accurate output. As a result, many such electronic devices include electronic output adjustments. For example, potentiometers or variable resistors are often included to allow a user to monitor and calibrate these electronic devices to a known reference.

In typical operation, an electronic pressure gauge goes through a routine monitoring cycle. Periodically, the output of the electronic pressure gauge is recorded. The pressure source is then measured by a reference pressure standard. If the output from the reference pressure standard is equal to the output from the electronic pressure gauge, then the gauge is assumed to be operating properly.

The electronic pressure gauge may also (or alternatively) go through a routine calibration cycle. A typical calibration cycle requires that the electronic pressure gauge be removed from the pressure source and connected to a source with a known output. To pass calibration, the electronic pressure gauge must provide an output that is equal (within limits) to the known output. The known output can be adjusted throughout an operating range to calibrate the electronic pressure gauge across that range.

What is needed is an electronic pressure gauge that is easy to monitor and/or calibrate, and is relatively small and functional.

SUMMARY OF THE INVENTION

A technological advance is achieved by an electronic pressure instrument that is easy to monitor and calibrate, and is relatively small and functional. In one embodiment, the electronic pressure instrument includes two pressure inputs for receiving two fluids, which can eventually be provided to a sensor/transducer for converting a pressure differential of the two fluids to an electrical signal. Positioned between the two pressure inputs and the transducer is a rotatable valve having a mechanical test port and a plurality of conduits for selectively directing at least one of the fluids to the transducer or the mechanical test port. When the valve is in a first position, the two fluids are directed to the transducer. When the valve is in a second position, the at least one fluid is directed to the mechanical test port.

In some embodiments, when the valve is in the second position, the at least one fluid is also directed to the transducer.

In some embodiments, when the valve is being rotated to the second position, at least one fluid is continually directed to the transducer.

In some embodiments, when the valve is in a third position, the first and second fluids are diverted from the transducer. In some embodiments, when the valve is in the third position, the conduits are operable to direct two different fluids from the mechanical test port to the transducer.

In some embodiments, the conduits are operable only when test lines have been engaged with the mechanical test port.

In some embodiments, the mechanical test port is operable to rotate the valve by engaging test lines with the mechanical test port and rotating the test lines.

In some embodiments, the valve includes a spring for returning the valve to the first position whenever the test lines are disengaged with the mechanical test port.

In some embodiments, the instrument includes an electrical test port for receiving an external electrical test device, thereby allowing the device to monitor an output of the transducer.

In some embodiments, a DIN rail clip is included for mounting the instrument onto a pair of DIN rails.

DETAILED DESCRIPTION OF THE PREFERRED EMBODIMENT

Figure 1:
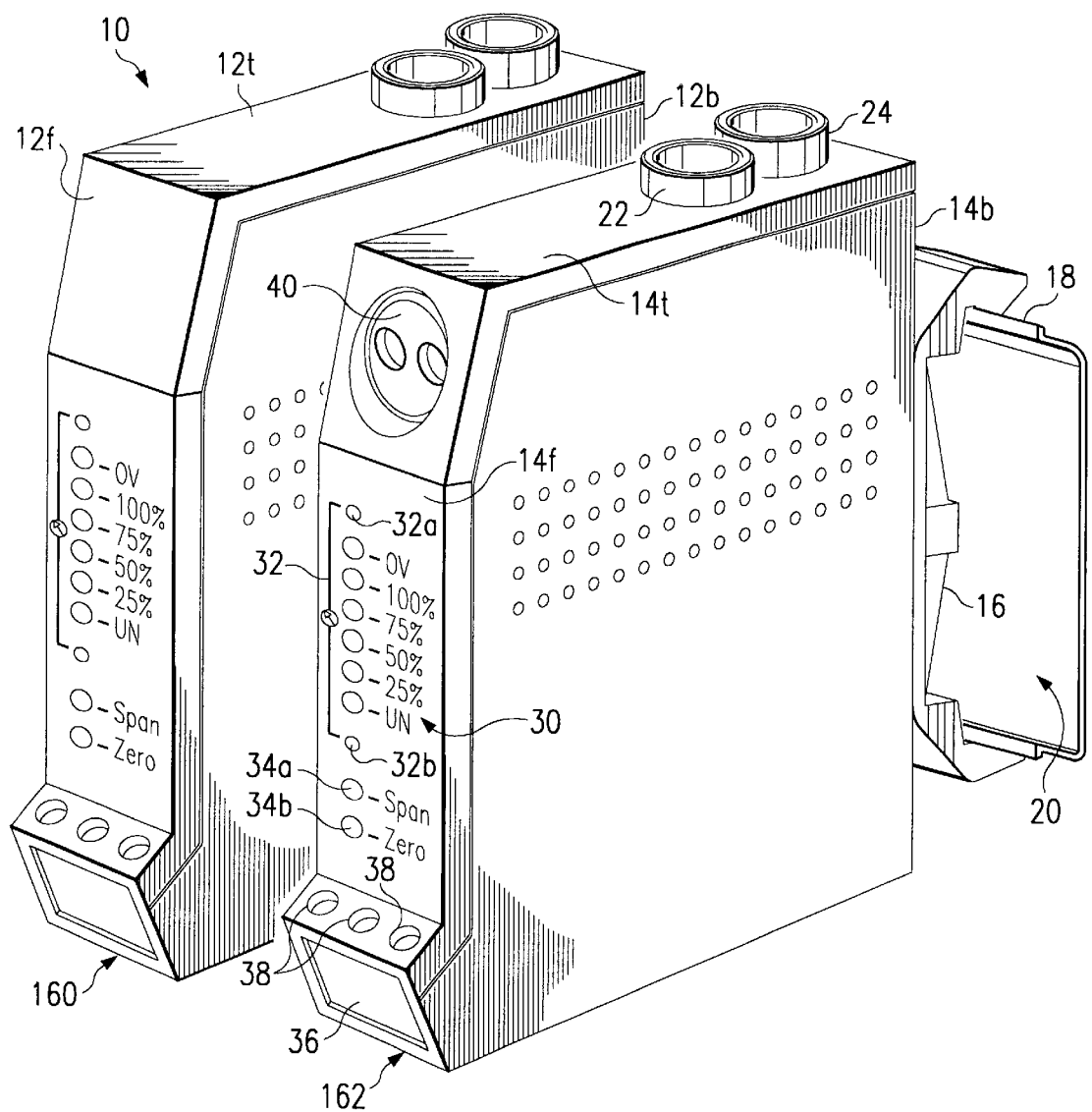
FIG. 1 is an isometric view of two electronic pressure instruments according to different embodiments of the present invention.

In FIG. 1, the reference numeral 10 refers to a measurement system embodying features of the present invention. In one embodiment, the measurement instrument 10 includes two electronic pressure instruments 12 and 14. Each instrument 12, 14 includes a plurality of faces, including a front face 12f, 14f, a back face 12b, 14b, and a top face 12t, 14t, respectively. The two electronic pressure instruments 12, 14 are similarly configured, except where explicitly describe below. Therefore, to describe the similar configuration, only the electronic pressure instrument 14 will be discussed.

The back face 14b of the electronic pressure instrument includes a mounting system. In one embodiment, a DIN rail clip 16 is used to selectively mount the instrument 14 to a mounting rail 18. The mounting rail 18 includes a rail channel 20 in a conventional DIN rail geometry that allows standard components to be mounted to the rails. Conventionally, DIN rails are used for items such as junction boxes and circuit breakers, but are used in the present embodiment to attach the two electronic pressure instruments 12 and 14.

The integration of the DIN rail clip 16 for the mounting rail 18 directly addresses the cost of installation by reducing labor and the potential size of the electronic pressure instruments 12 and 14. Conventionally, a system includes some type of programmable controller along with other associated test devices, such as low pressure differential sensors. Even the smallest sensor available uses a two hole mounting scheme to affix the sensor to the cabinet. Several actions result from this conventional mounting scheme. The installer must drill and tap two holes, by hand, for each transducer to be mounted on a panel. The panel is quite large because of the amount of equipment that is assembled thereon. The fact that several transducers are used often makes the panel even larger because the end to end mounting technique used (a result of the transducer package) forces the width of the panel to grow. These all add to the cost of installation.

The top face 14t of the electronic pressure instrument 14 includes two fluid inputs 22, 24. The inputs 22, 24 are for connecting with two fluid sources (not shown) in a leak proof manner and directing the fluid into the pressure instrument 14. It is understood that discussion of fluid flow and fluid movement are, in the present embodiment, directed towards fluid pressure measurement.

The front face 14f of the electronic pressure instrument 14 includes a plurality of indicators 30. In one embodiment, the indicators 30 are light emitting diodes. The front face 14f also includes two test ports 32a, 32b (collectively designated with the numeral 32). The test ports 32 allow two probes (not shown) to be inserted to measure an electrical output of the pressure instrument 14. The probes may form a serial or parallel connection with the test ports 32, as needed.

The front face 14f also includes a plurality of calibration devices 34a, 34b. In one embodiment, the calibration devices are two potentiometers that can be manually adjusted. The calibration devices can be used for a calibration mode, discussed in greater detail, below. The front face 14f also includes a plurality of electrical outputs 36, 38. In one embodiment, the electrical outputs 36, 38 produce the electrical voltage differential (or current, as desired) responsive to a pressure differential from the two inputs 22, 24. This operation is also discussed in greater detail, below.

The two electronic pressure instruments 12, 14 are different in that the front face 14f of the instrument 14 includes a valve port 40. The valve port 40 allows an external probe (not shown) to be selectively connected to the instrument 14 and to perform various monitoring and/or calibration activities. These activities are discussed in greater detail, below.

Figure 2:
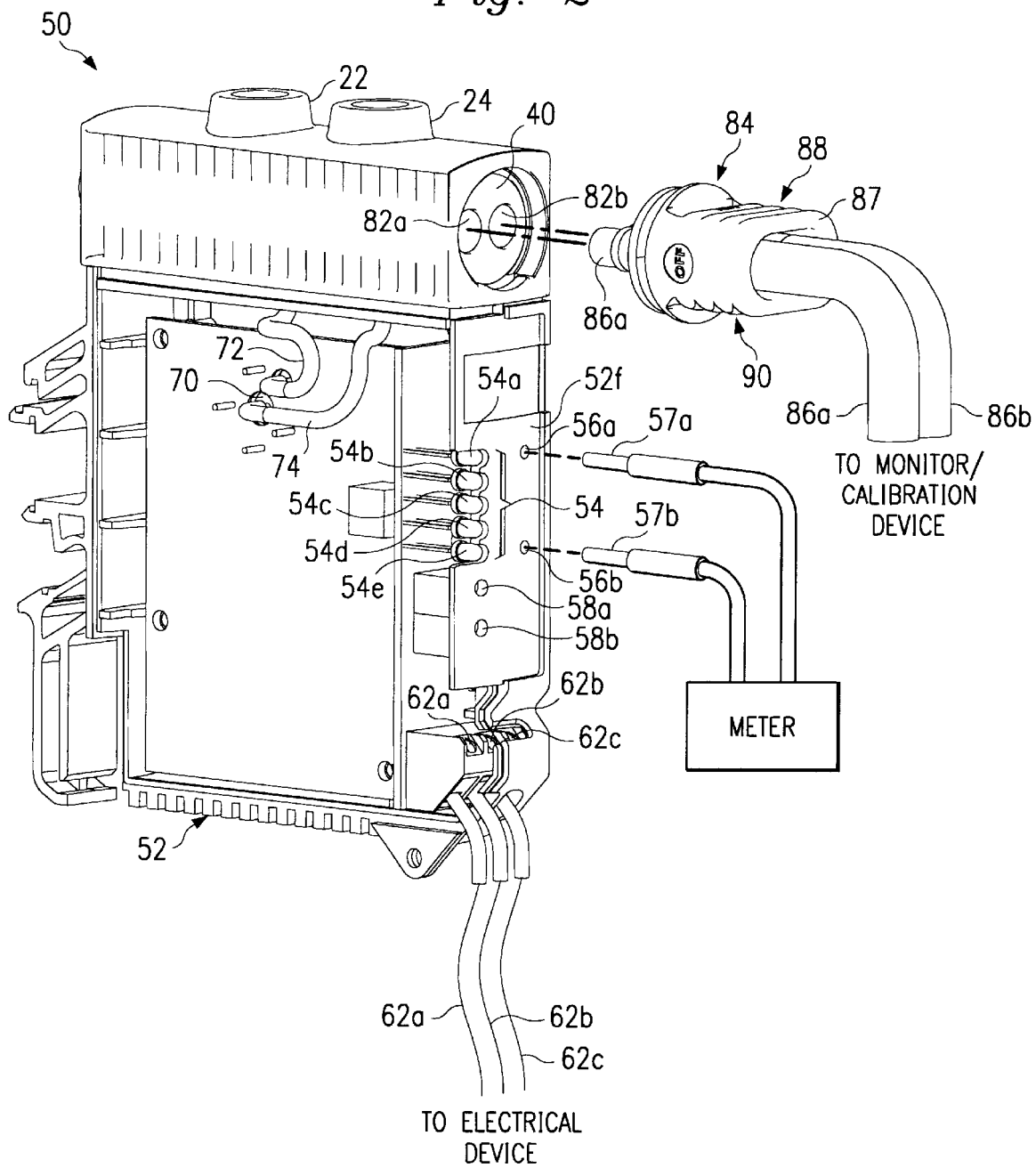
FIG. 2 is an isometric cut-away view of one of the electronic pressure instruments of FIG. 1.
Figure 3:
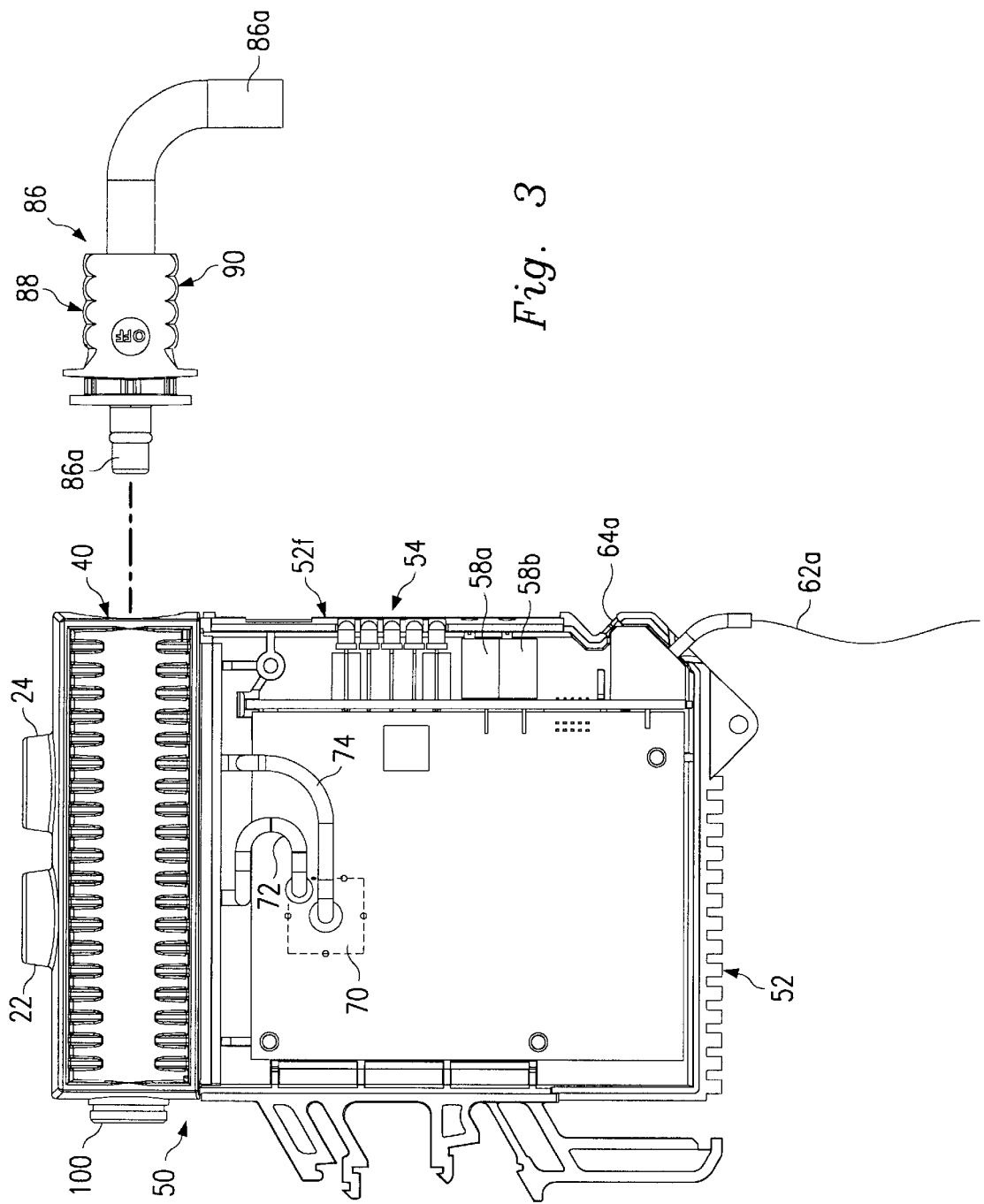
FIG. 3 is a side cross-sectional view of the electronic pressure instrument of FIG. 2.

Referring now to FIGS. 2 and 3, another embodiment of an electronic pressure instrument is designated with the reference numeral 50. Components of the electronic pressure instrument 50 that are identical to those of electronic pressure instruments 12 and 14 (FIG. 1) are similarly numbered.

The electronic pressure instrument 50 includes a plastic shell 52 with a plurality of faces, including a front face 52f. The front face 52f includes a plurality of indicators 54. In one embodiment, the indicators 54 are light emitting diodes (LED's) that are activated to indicate the conditions identified in Table 1, below.

TABLE 1

| LED | Condition |
|---|---|
| 54a | the pressure differential is positive, and exceeds a preset limit |
| 54b | the pressure differential is within positive operating limits |
| 54c | there is no pressure differential |
| 54d | the pressure differential is within negative operating limits |
| 54e | the pressure differential is negative, and exceeds a preset limit |

The front face 52f also includes two test ports 56a, 56b. The test ports 56a, 56b allow two probes 57a, 57b, respectively, to be inserted to measure an electrical output of the pressure instrument 50. The probes may form a serial or parallel connection with the test ports 56a, 56b, as needed. In the case of a serial connection for measuring electrical current, a silicon diode (not shown) can be placed inside the pressure instrument 50 between the two ports 56a, 56b. The low impedance of an amp meter shunts all the current through the meter. This allows a user to know the current output of the sensor, in case an electrical problem exists elsewhere in the electronic pressure instrument 50, without disconnecting the instrument.

The front face 52f also includes a plurality of electrical calibration devices 58a, 58b. In one embodiment, the electrical calibration devices are two potentiometers that can be manually adjusted. The calibration devices 58a, 58b can be used for a calibration mode, discussed in greater detail, below.

The front face 52f also includes a plurality of electrical outputs. In the present embodiment, three electrical lines 62a, 62b, 62c are connected to three screw-type terminals 64a, 64b, 64c, respectively. The electrical lines 62a, 62b, 62c further connect to another electrical device (not shown) to provided an electrical representation of the pressure difference between two fluids flowing through the two fluid inputs 22, 24. The terminals 64a, 64b, 64c can be used to attach additional electrical lines, test equipment, or facilitate other applications.

The electronic pressure instrument 50 includes a pressure transducer 70 that receives fluid from two fluid tubes 72, 74, measures the pressure difference between the fluids in the tubes, and converts the pressure difference to an electrical output. For the sake of example, the pressure transducer 70 may be a sensor device as described in U.S. Pat. No. 4,996,627, which is hereby incorporated by reference. The electrical output is then provided to the two electrical lines 62a, 62b and two screw-type terminals 64a, 64b. The third electrical line 62c and third terminal 64c provide an electrical common voltage.

The valve port 40 includes two apertures 82a, 82b that are adapted to receive a probe 84. The probe 84 includes two test lines 86a, 86b, for engaging with the apertures 82a, 82b, respectively. In one embodiment, the apertures 82a, 82b remain leak proof unless and until the test lines 86a, 86b are inserted. At that time, fluid may flow through the apertures 82a, 82b and the test lines 86a, 86b, respectively. In one embodiment, the probe 84 includes a hand unit 87 so that a person's hand can easily insert and remove the test lines 86a, 86b into the valve port 40. Also, the probe 84 is configured with two depressions 88, 90 so that the probe can be easily rotated, thereby rotating the valve port 40 when engaged.

The valve port 40 is attached to a rotatable selecting valve cylinder 100. The valve cylinder 100 includes a plurality of apertures for selectively connecting the valve port 40, the two fluid tubes 72, 74, and the two fluid inputs 22, 24. By rotating the valve port 40, and thus the valve cylinder 100, the electronic pressure instrument 50 can be placed in various modes of operation: a normal mode, a monitor mode, and a calibrate mode.

Figure 4A:
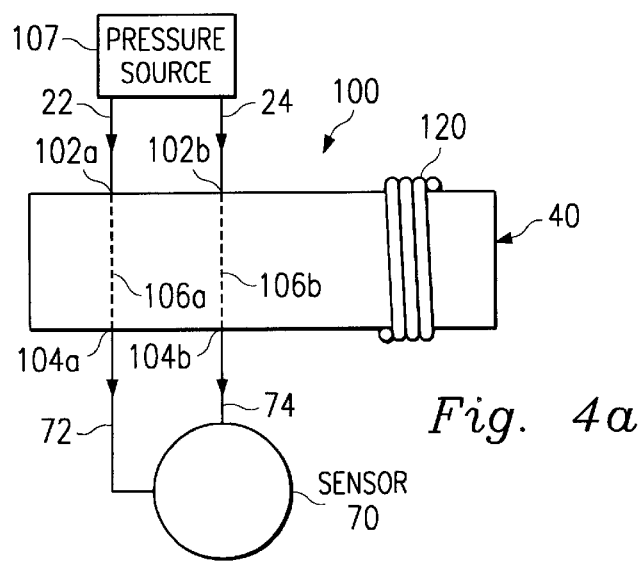
FIGS. 4a and 4b are functional diagrams of a valve cylinder of the electronic pressure instrument of FIG. 2 being in an operating mode position.
Figure 4B:
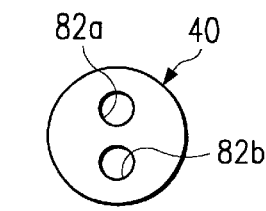

Referring to FIGS. 4a and 4b, the electronic pressure instrument 50 is in the normal operation mode when the valve port 40, and hence the valve cylinder 100, is rotated into a first position, as illustrated. The valve port 40 may be easily rotated by engaging the probe 84 (FIG. 3) with the valve port and manually turning the probe accordingly. In this first position, apertures 102a, 102b align with the two fluid inputs 22, 24, respectively, and apertures 104a, 104b align with the two fluid tubes 72, 74, respectively. Aperture 102a is connected to aperture 104a by an internal routing mechanism 106a, and aperture 102b is connected to aperture 104b by an internal routing mechanism 106b. In the present embodiment, the routing mechanisms are conduits formed in the valve cylinder 100. Fluid can thereby flow from the pressure source 107, through the fluid inputs 22, 24, through the conduits 106a, 106b, through the fluid tubes 72, 74, and to the sensor 70.

Figure 5A:
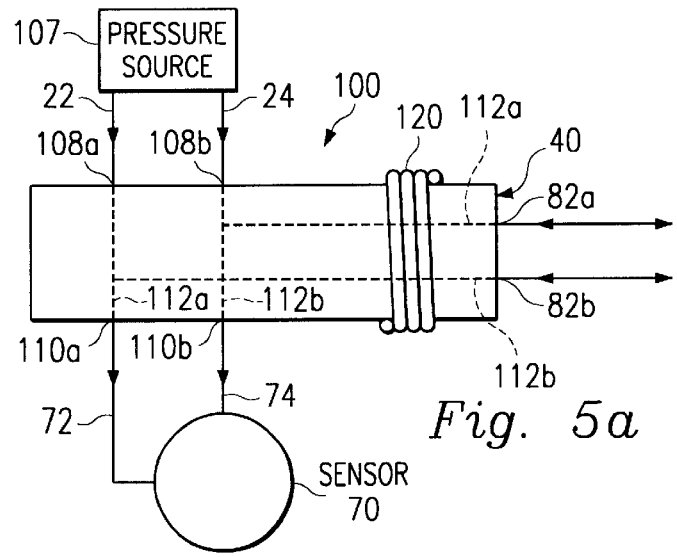
FIGS. 5a and 5b are functional diagrams of a valve cylinder of the electronic pressure instrument of FIG. 2 being in a monitoring mode position.
Figure 5B:
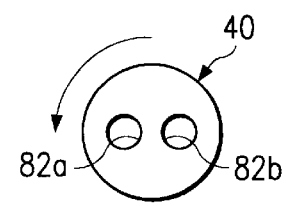

Referring to FIGS. 5a and 5b, the electronic pressure instrument 50 is in the monitoring operation mode when the valve port 40, and hence the valve cylinder 100, is rotated into a second position, as illustrated. In this second position, apertures 108a, 108b align with the two fluid inputs 22, 24, respectively, and apertures 110a, 110b align with the two fluid tubes 72, 74, respectively. Aperture 108a is connected to aperture 110a by a conduit 112a, and aperture 108b is connected to aperture 110b by a conduit 112b. Conduit 112a is also connected to aperture 82a and conduit 112b is also connected to aperture 82b, both on the valve port 40. Fluid can thereby flow from the pressure source 107, through the fluid inputs 22, 24, through the conduits 112a, 112b, through the fluid tubes 72, 74, and to the sensor 70. The fluid can also flow through the conduits 112a, 112b, through the test lines 86a, 86b, and to a monitoring device (FIG. 2).

Figure 6A:
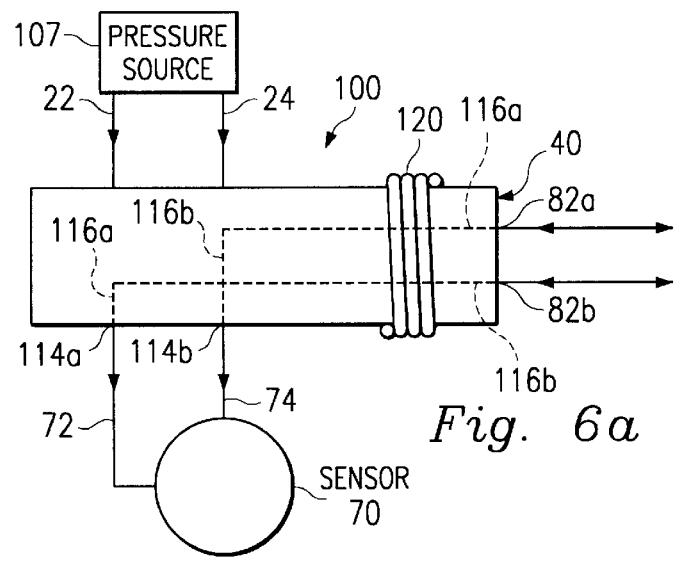
FIGS. 6a and 6b are functional diagrams of a valve cylinder of the electronic pressure instrument of FIG. 2 being in a calibrating mode position.
Figure 6B:
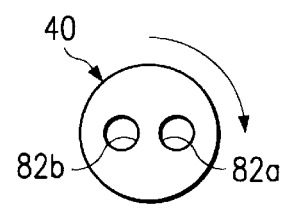

Referring to FIGS. 6a and 6b, the electronic pressure instrument 50 is in the calibrating operation mode when the valve port 40, and hence the valve cylinder 100, is rotated into a third position, as illustrated. In this third position, the two fluid inputs 22, 24 (and hence the pressure source 107) are shut off from the two fluid tubes 72, 74, respectively. Apertures 114a, 114b in the valve cylinder 100 align with the two fluid tubes 72, 74, respectively and connected to apertures 82a, 82b through conduits 116a, 116b, respectively. Fluid can thereby flow to and from a calibration device through the test lines 86a, 86b (FIG. 2), through the conduits 116a, 116b, and to the sensor 70.

With the above described monitoring and calibration mode operations, no additional devices are required and no manual disconnections must be performed. Once the test lines 86a, 86b are inserted, monitoring and/or calibration can be readily performed. In some embodiments, a spring 100 returns the valve cylinder 100 to the first position, so that after monitoring mode or calibration mode operation has been completed, the test lines 86a, 86b can be simply removed from the apertures 82a, 82b and the pressure instrument 50 returns to normal operating mode.

Figure 7:
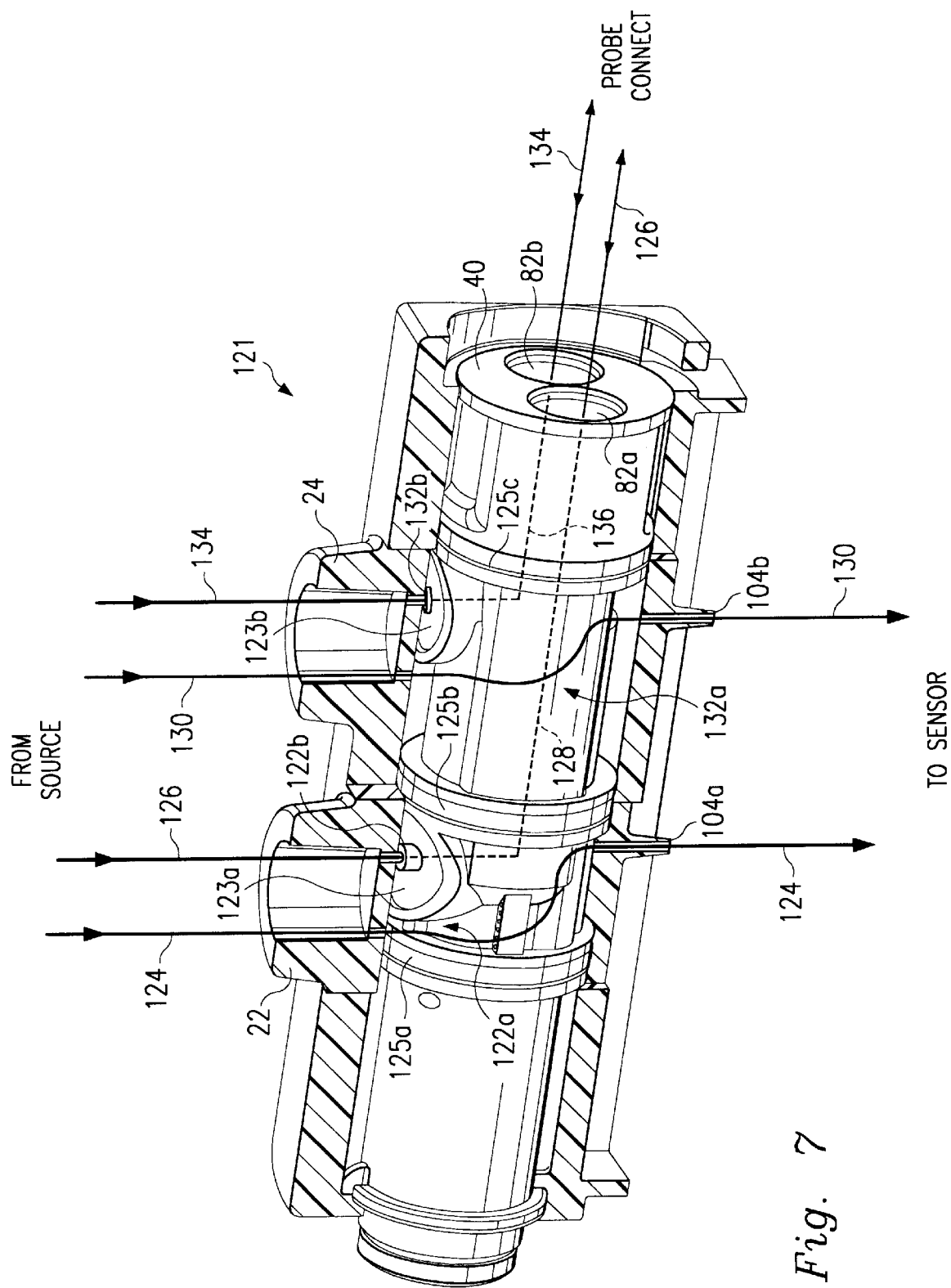
FIG. 7 is an isometric view of another embodiment of a valve cylinder.

Referring now to FIG. 7, another embodiment of the valve cylinder is identified with the reference numeral 120. The valve cylinder 120 has many of similar elements as valve cylinder 100 (FIGS. 4–6), the similar elements retaining the same reference numeral. However, the valve cylinder 120 allows a fluid to continuously flow from the fluid inputs 22, 24 to the sensor 70 when the valve cylinder is being rotated from the operating mode position to the monitor mode position (illustrated).

To accomplish the continuous flow, two apertures 122a, 122b connect with the fluid input 22 when the valve cylinder 120 is in the monitor mode position, and only one aperture 122a connects with the fluid input 22 when the valve cylinder 120 is in the operating mode position. In addition, the aperture 122a is beyond the sealing portion of an o-ring 123a surrounding the aperture 122b. That is, the aperture 122a remains connected to the fluid input 22 while the valve cylinder is being rotated from operating mode to monitoring mode position. In this way, a fluid 124 can flow from the fluid source, through the aperture 122a, through the aperture 104a, and to the sensor 70. The aperture 122a is surrounded by two o-rings 125a, 125b so that the fluid 124 is securely directed to the aperture 104a. In contrast, the aperture 122b is only connected to the fluid input 22 when the valve cylinder is in monitoring mode. In this way, a fluid 126 can flow from the fluid source, through the aperture slot 122b (only when the valve cylinder is in the monitoring mode), through a conduit 128, and through the aperture 82a.

In a similar manner, a fluid 130 can continuously flow from the fluid input 24, through an aperture 132a and through the aperture 104b. The aperture 132a is surrounded by two o-rings 125b, 125c so that the fluid 130 is continually directed towards the aperture 104b while the valve cylinder 120 is being rotated between the operating and monitoring modes. However, a fluid 134 is directed through an aperture 132b, through a conduit 136, and through the aperture 82b. An o-ring 123b surrounds the aperture 132b so that the fluid 134 flows only when the valve cylinder is in the monitoring mode.

Additional modifications, changes, and substitutions are intended in the foregoing disclosure. Accordingly, it is appropriate that the appended claims be construed broadly and in a manner consistent with the scope of the invention.

What is claimed is:

1. A pressure measurement instrument comprising:
    a housing;
    first and second pressure inputs on said housing for receiving first and second fluids, respectively;
    a pressure to electrical transducer in said housing for converting a pressure differential to an electrical signal;
    a movable valve on said housing having a mechanical test port and a plurality of conduits for selectively directing at least one of the fluids,
    so that when the valve is in a first position, the first and second fluids are directed to the transducer, and when the valve is in a second position, at least one fluid is directed to the mechanical test port.

2. The pressure measurement instrument of claim 1 wherein, when the valve is in the second position, the at least one fluid is also directed to the transducer.

3. The pressure measurement instrument of claim 2 wherein, when the valve is being moved to the second position, the at least one fluid is continually directed to the transducer.

4. The pressure measurement instrument of claim 1 wherein, when the valve is in a third position, the first and second fluids are diverted from the transducer.

5. The pressure measurement instrument of claim 4 wherein, when the valve is in the third position, the conduits are operable to direct a third and fourth fluid from the mechanical test port to the transducer.

6. The pressure measurement instrument of claim 1 wherein the conduits are operable only when test lines have been engaged with the mechanical test port.

7. The pressure measurement instrument of claim 1 wherein the mechanical test port is operable to rotate the valve by engaging test lines with the mechanical test port and rotating the test lines.

8. The pressure measurement instrument of claim 7, further comprising:
    a test fitting for returning the valve to the first position whenever the test lines are to be engaged or disengaged with the mechanical test port.

9. The pressure measurement instrument of claim 1 further comprising:

an electrical test port for receiving an external electrical test device, thereby allowing the device to monitor an output of the transducer.

10. The pressure measurement instrument of claim 1 further comprising:
a DIN rail clip for mounting the instrument onto a pair of DIN rails.

11. An electronic instrument for providing an electrical output responsive to a pressure of a first fluid, comprising:
a housing,
an operation input in said housing for receiving the first fluid;
a pressure to electrical transducer in said housing for converting a pressure of a received fluid to an electrical signal;
a mechanical test port on said housing with a test input for receiving a second fluid; and
a movable valve on said housing for selectively directing one of either the first or second fluid to the transducer,
so that when the valve is in a first position, the first fluid is directed to the transducer, and when the valve is in a second position, the second fluid is directed to the transducer.

12. The electronic instrument of claim 11 wherein, when the valve is in a third position, the first fluid is also directed to the mechanical test port.

13. The electronic instrument of claim 11 wherein the mechanical test port becomes conductive only when the second fluid is being received by the mechanical test port.

14. The electronic instrument of claim 11 wherein the mechanical test port is operable to move the valve by engaging test lines with the mechanical test port and moving the test lines.

15. The electronic instrument of claim 11 further comprising:
a test fitting for returning the valve to the first position whenever the test lines are to be engaged or disengaged with the mechanical test port.

16. The electronic instrument of claim 11 further comprising:
an electrical test port for receiving an external electrical test device, thereby allowing the external electrical test device to monitor an output of the transducer.

17. The electronic instrument of claim 10 further comprising:
a DIN rail clip for mounting the instrument onto a pair of DIN rails.

18. An electronic pressure instrument comprising:
a housing;
first and second pressure inputs on said housing for receiving first and second fluids, respectively;
a pressure to electrical transducer in said housing for converting a pressure differential to an electrical signal;
a mechanical test port for on said housing selectively engaging the first and second test lines;
a rotatable valve on said housing connected to the mechanical test port and having a plurality of conduits for selectively directing fluids, so that when the valve is rotated to an operating position the first and second fluids are directed to the transducer and not to the mechanical test port, when the valve is rotated to a monitor position the first and second fluids are directed to both the transducer and to the first and second test lines, respectively, and when the valve is rotated to a calibration position, the first and second fluids are obstructed while a third and fourth fluid are directed from the first and second test lines to the transducer; and
a test fitting for returning the valve to the operating position whenever the test lines are to be engaged or disengaged with the mechanical test port.

19. The electronic pressure instrument of claim 18 wherein two of the conduits of the rotatable valve are slots that continually direct the first and second fluids to the transducer whenever the valve is in the operating position, the monitoring position, or being rotated there between,
an electrical test port for receiving an external electrical test device, thereby allowing the device to monitor an output of the transducer.

20. The electronic pressure instrument of claim 18 further comprising:
an electrical test port for receiving an external electrical test device, thereby allowing the device to monitor an output of the transducer.

21. A method of measuring pressure using an electronic instrument for providing an electrical output responsive to a pressure of a fluid, comprising:
receiving a first fluid at an operation input;
converting a pressure of a received fluid to an electrical signal at a transducer;
receiving one of said first fluid and a second fluid at a mechanical test port;
selectively directing one of the first or second fluid using a movable valve, so that when the valve is in a first position, at least one fluid is directed to the transducer, and when the valve is in a second position, at least one fluid is permitted to flow between the transducer and the mechanical test port; and
providing said operation input, said transducer, said mechanical test port and said movable valve as integral parts of a test instrument contained in a single housing.

22. The method of claim 21 wherein, when the valve is in a third position, the at least one fluid is also directed to the mechanical test port.

23. The method of claim 21 wherein, while the valve is being moved to the second position, the at least one fluid is continually directed to the transducer.

24. The method of claim 21 and further including engaging test lines with said mechanical test port.

25. The method of claim 24 further comprising:
returning the valve to the first position whenever the test lines are to be engaged or disengaged with the mechanical test port.

26. The electronic instrument of claim 21 further comprising:
monitoring an output of the transducer at an electrical test port using an external electrical test device.

27. A pressure measurement instrument comprising:
a housing;
first and second pressure inputs on said housing for receiving first and second fluids, respectively;
a pressure to electrical transducer in said housing for converting a pressure differential to an electrical signal;
a mechanical test port on said housing for selectively engaging the first and second test lines; and
a rotatable valve on said housing having a plurality of conduits for selectively directing fluids, so that when the valve is rotated to a operating position the first and second fluids are directed to the transducer and not to the mechanical test port, when the valve is rotated to a monitor position the first and second fluids are directed to both the transducer and to the first and second test lines, respectively, and when the valve is rotated to a calibration position, the first and second fluids are obstructed while a third and fourth fluid are directed from the first and second test lines to the transducer.

* * * * *

UNITED STATES PATENT AND TRADEMARK OFFICE
CERTIFICATE OF CORRECTION

PATENT NO. : 6,401,543 B1  Page 1 of 1
DATED : June 11, 2002
INVENTOR(S) : Steve A. Raccio et al.

It is certified that error appears in the above-identified patent and that said Letters Patent is hereby corrected as shown below:

Column 2,
Line 52, replace "where explicitly describe" with -- where explicitly described --

Column 5,
Line 43, replace "100 returns the" with -- 120 returns the --
Line 49, replace "numeral 120" with -- numeral 121 --
Line 50, replace "cylinder 120" with -- cylinder 121 --
Line 52, replace "cylinder 120" with -- cylinder 121 --
Line 59, replace "120 is in the" with -- 121 is in the --
Line 61, replace "cylinder 120" with -- cylinder 121 --

Column 6,
Line 15, replace "120 is being" with -- 121 is being --

Signed and Sealed this

Seventeenth Day of September, 2002

Attest:

Attesting Officer

JAMES E. ROGAN
*Director of the United States Patent and Trademark Office*